(12) United States Patent
Shen (10) Patent No.: US 11,572,962 B1
(45) Date of Patent: Feb. 7, 2023

(54) DIVERTER VALVE DRIVE MECHANISM (71) Applicant: HAITIMA CORPORATION, Taipei (TW)

(72) Inventor: Ming-Show Shen, Taipei (TW)

(73) Assignee: HAITIMA CORPORATION, Taipei (TW)

( * ) Notice: Subject to any disclaimer, the term of this patent is extended or adjusted under 35 U.S.C. 154(b) by 0 days.

(21) Appl. No.: 17/560,754

(22) Filed: Dec. 23, 2021

(51) Int. Cl.
  *F16K 31/04* (2006.01)
  *F16K 31/05* (2006.01)
  *F16K 1/22* (2006.01)
(52) U.S. Cl.
  CPC ............ *F16K 31/047* (2013.01); *F16K 1/221* (2013.01); *F16K 31/055* (2013.01)
(58) Field of Classification Search
  CPC ...... F16K 31/047; F16K 1/221; F16K 31/055; F16K 31/535
  See application file for complete search history.

(56) References Cited

U.S. PATENT DOCUMENTS

| 2017/0114919 | A1* | 4/2017 | Ohashi | F16K 31/045 |
| 2018/0298988 | A1* | 10/2018 | Hsu | F16K 31/60 |
| 2020/0284307 | A1* | 9/2020 | Williams | F16K 31/535 |
| 2020/0326011 | A1* | 10/2020 | Williams | F16K 31/05 |

FOREIGN PATENT DOCUMENTS

TW 448590 U * 3/2013 ........... F16H 57/082

* cited by examiner

*Primary Examiner* — Marina A Tietjen
(74) *Attorney, Agent, or Firm* — Bacon & Thomas, PLLC (57) ABSTRACT

A diverter valve drive mechanism is provided with a valve body and a driving main body, wherein a valve piece is arranged inside the valve body, and by adjusting the rotation angle of the valve piece, the fluid flow through the valve body can be controlled, and the valve piece is controlled Driven by the drive main body connected to the valve body; the drive main body is provided with a driving assembly, the driving assembly is composed of a motor, a plurality of gear sets and a hand wheel, and the rotation angle of the valve piece can be controlled by a motor Adjusted or adjusted via hand wheel control, the driving assembly is provided with a Bluetooth module that allows the motor to be controlled and driven via the remote.

6 Claims, 8 Drawing Sheets

DIVERTER VALVE DRIVE MECHANISM

BACKGROUND OF THE INVENTION

Field of the Invention

The present invention relates to a diverter valve drive mechanism, in particular to a driving assembly for controlling the valve plate of diverter valve, which is composed of a motor, a majority gear set and a hand rotating wheel, etc. The angle of valve plate can be adjusted via a motor or a hand wheel, and the driving assembly is provided with a Bluetooth module that allows the motor to be controlled and driven via remote operation.

Description of Related Art

The diverter valve is mainly used on the pipeline, when in use, the two sides are connected by a flange to a pipeline. When the valve plate inside the diverter valve is rotated, the flow and flow rate of the fluid from one pipeline to the other pipeline can be adjusted.

Since the valve plate of the diverter valve is mainly rotated in a fluid-filled line, it requires a large torque to overcome the resistance of the fluid, especially for controlling the discharge of drainage or other large fluids in the ship's pipeline. Large horsepower motors and large linkages are indispensable. However, the use of large motors and large linkages has caused the entire control mechanism to be more oversize, not only taking up space, but also making the overall weight too difficult to implement.

In view of the above conditions, the inventor has developed and designed the diverter valve of this invention after continuous research and experimental improvement. The driving mechanism can eliminate the deficiencies and shortcomings produced by the conventioneer ones.

SUMMARY OF THE INVENTION

Therefore, the present invention is objected to providing a diverter valve drive mechanism that minimizes the overall volume of the diverter valve drive mechanism and maintains a large output torque.

According to the diverter valve drive mechanism of the present invention, a brushless motor is used as a power source, and the brushless motor can be driven through a Bluetooth module by a remote operation, this is a second object of the present invention.

According to the diverter valve drive mechanism of the present invention, the rotation angle of the valve plate of the valve body can be controlled by the motor or by the hand wheel control, which is another object of the present invention.

The detailed structure, application principle, functions and effectiveness of the present invention will be apparent with reference to the following description in conjunction with the accompanying drawings.

DETAILED DESCRIPTION OF PREFERRED EMBODIMENT

In the following, in order to facilitate the description of the drawings, the screws or waterproof seals for locking the components in the drawings are omitted.

Figure 1:
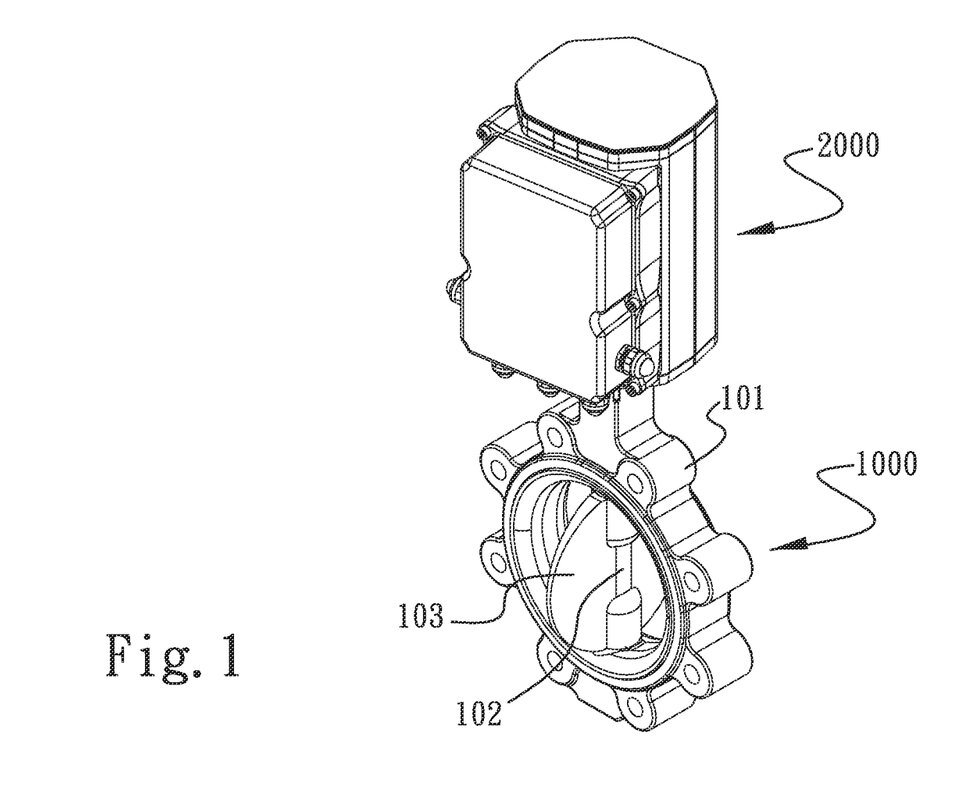
FIG. 1 is a perspective assembled view of the diverter valve drive mechanism of present invention.
Figure 2:
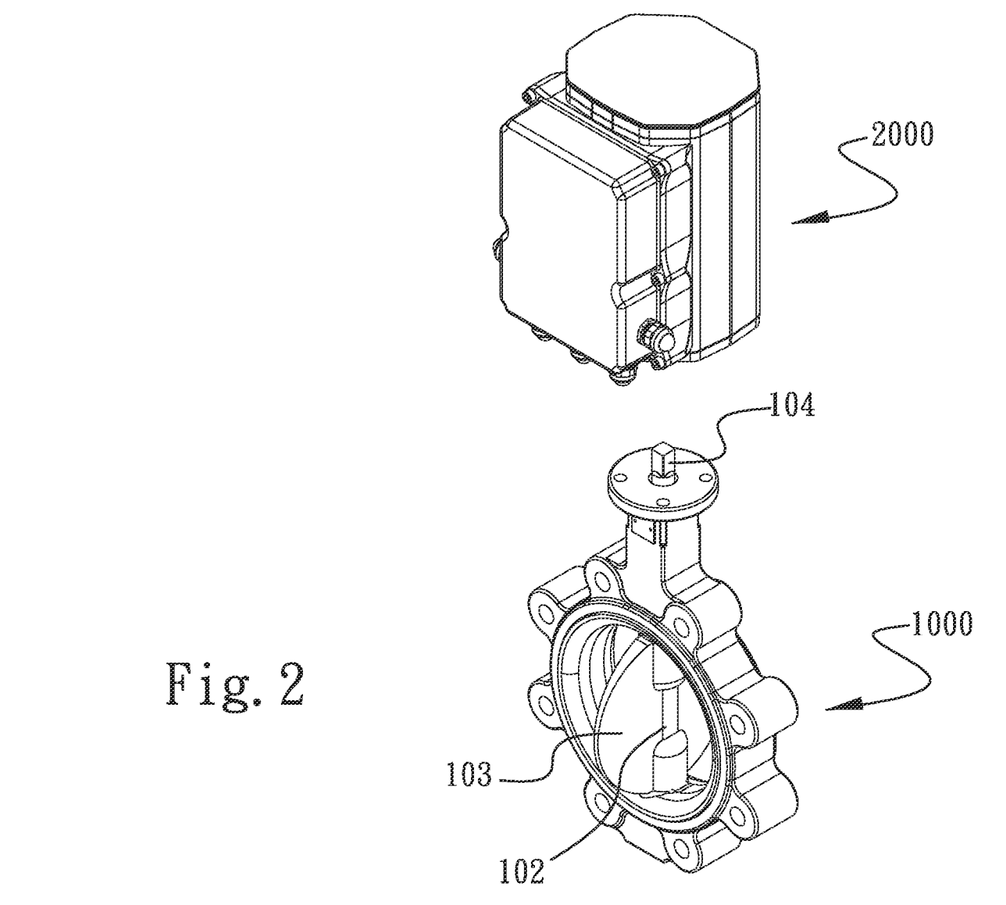
FIG. 2 is a perspective view of the valve body and the driving host mechanism of the present invention.

The diverter valve drive mechanism of the present invention, as shown in FIGS. 1 and 2, includes: a valve body 1000 and a driving host mechanism 2000. The valve body 1000 is provided with a pipe joint 101. The pipe joint 101 is a ring-shaped frame body, and two sides of the pipe joint 101 are respectively connected to a pipeline (not shown) through a flange, and a rotating shaft 102 is disposed at the center thereof. When the rotating shaft 102 rotates, a valve piece 103 is driven to rotate in the pipe joint 101, thereby control the flow of the fluid through the pipe joint 101. The upper end of the rotating shaft 102 is provided with a corner block portion 104 that protrudes upward.

Figure 3:
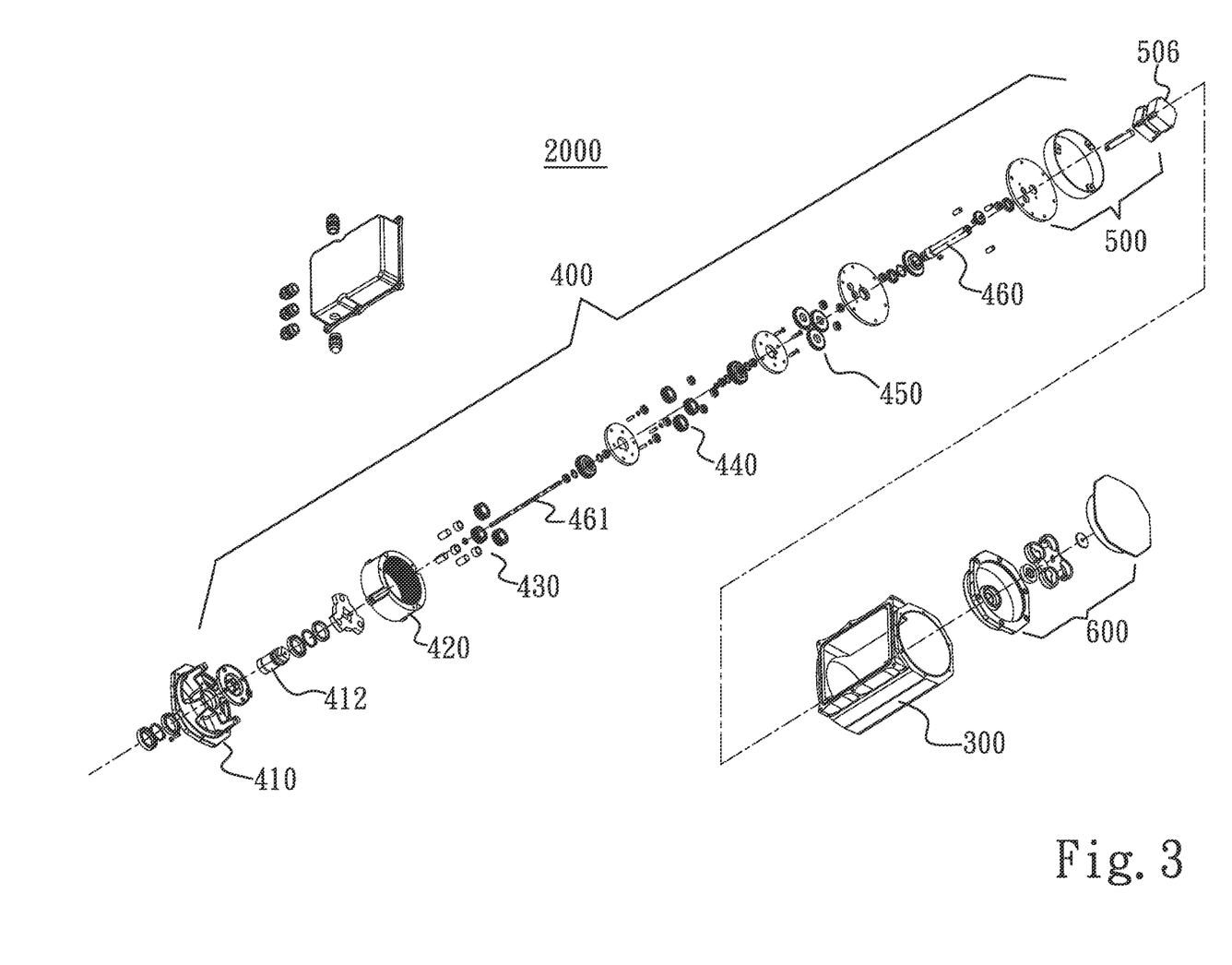
FIG. 3 is an exploded perspective view of the diverter valve drive mechanism of the present invention.

Please refer to FIG. 3, the drive host mechanism 2000 includes a frame body 300 and a driving assembly 400. The driving assembly 400 includes a base 410, an internal gear ring 420, a first gear set 430, a second gear set 440, a third gear set 450, a spindle sleeve 460, a drive mechanism set 500, and a manual control unit 600. The driving mechanism set 500 is provided with a motor that can drive said spindle sleeve 460 to rotate, and interlocks the first gear set 430, the second gear set 440, the third gear set 450, and the base. An output shaft 412 at the bottom center of the 410 finally drives the valve piece 103 of the valve body to rotate; and the spindle sleeve 460 can also be directly driven by the manual control unit 600.

Figure 7:
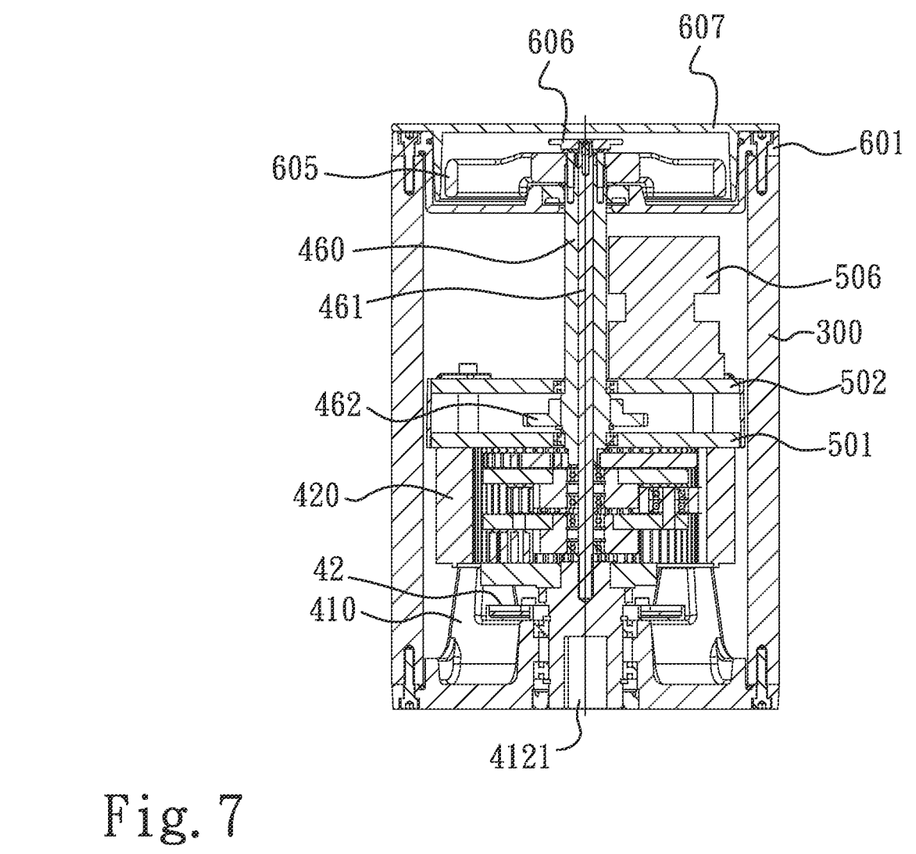
FIG. 7 is a sectional view showing the combination of the diverter valve drive mechanism of the present invention.
Figure 8:
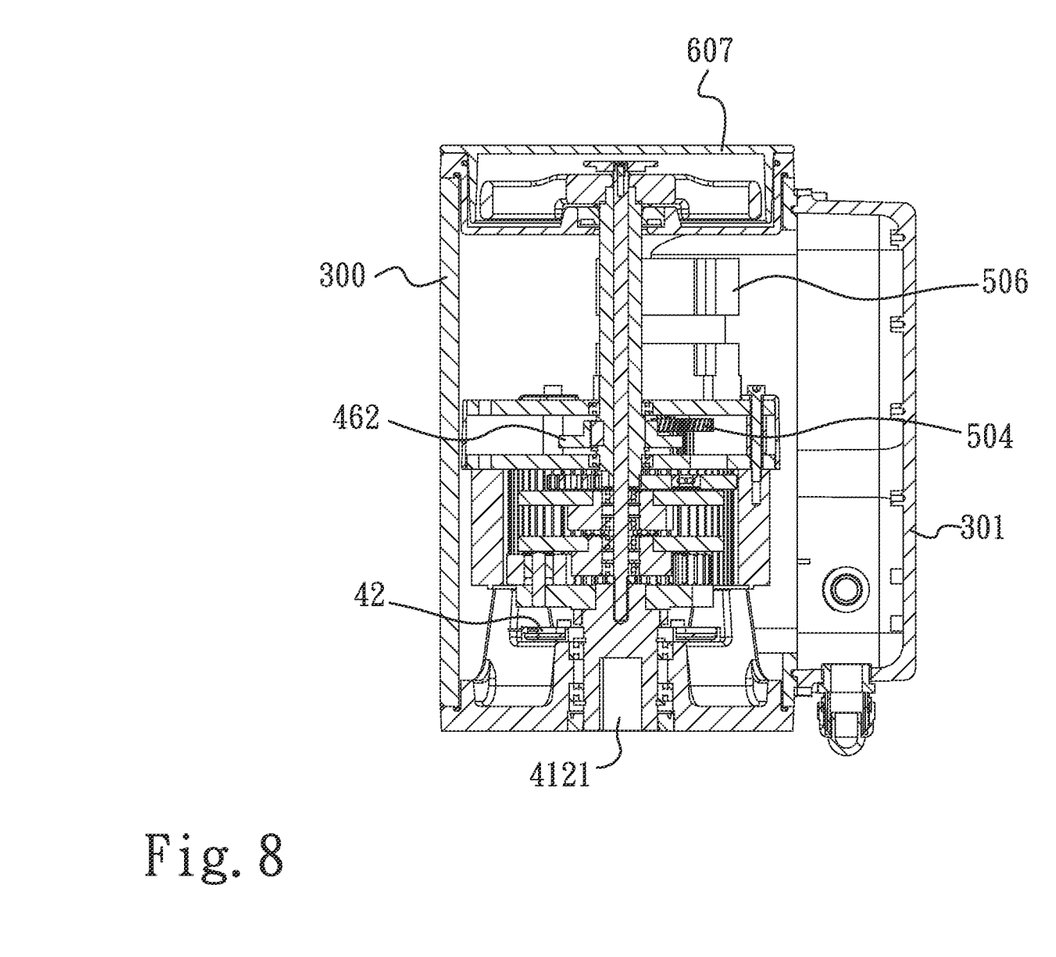
FIG. 8 is a combined cross-sectional view of another angle of the diverter valve drive mechanism of the present invention.

As shown in the figure, the output shaft 412 is disposed at the bottom center of the base 410. The bottom end of said output shaft 412 is provided with a multi-angle blind hole 4121 (as shown in FIGS. 7 and 8). The multi-angle blind hole 4121 can be engaged with the corner block portion 104 of the upper end of the rotating shaft 102 of the pipe joint 101 is engaged. The inner ring gear 420 is disposed at an upper end of the base 410; the first gear set 430, the second gear set 440, and the third gear set 450 are disposed inside the inner ring gear 420; said drawing mechanism set 500 is disposed at an upper end of the inner ring gear 420. Said spindle sleeve 460 is disposed through the driving mechanism set 500 and driven by a motor 506. The spindle sleeve 460 is coupled to the output shaft 412 by a main shaft 461. The spindle sleeve 460 can also be driven said the manual control unit 600.

Figure 4:
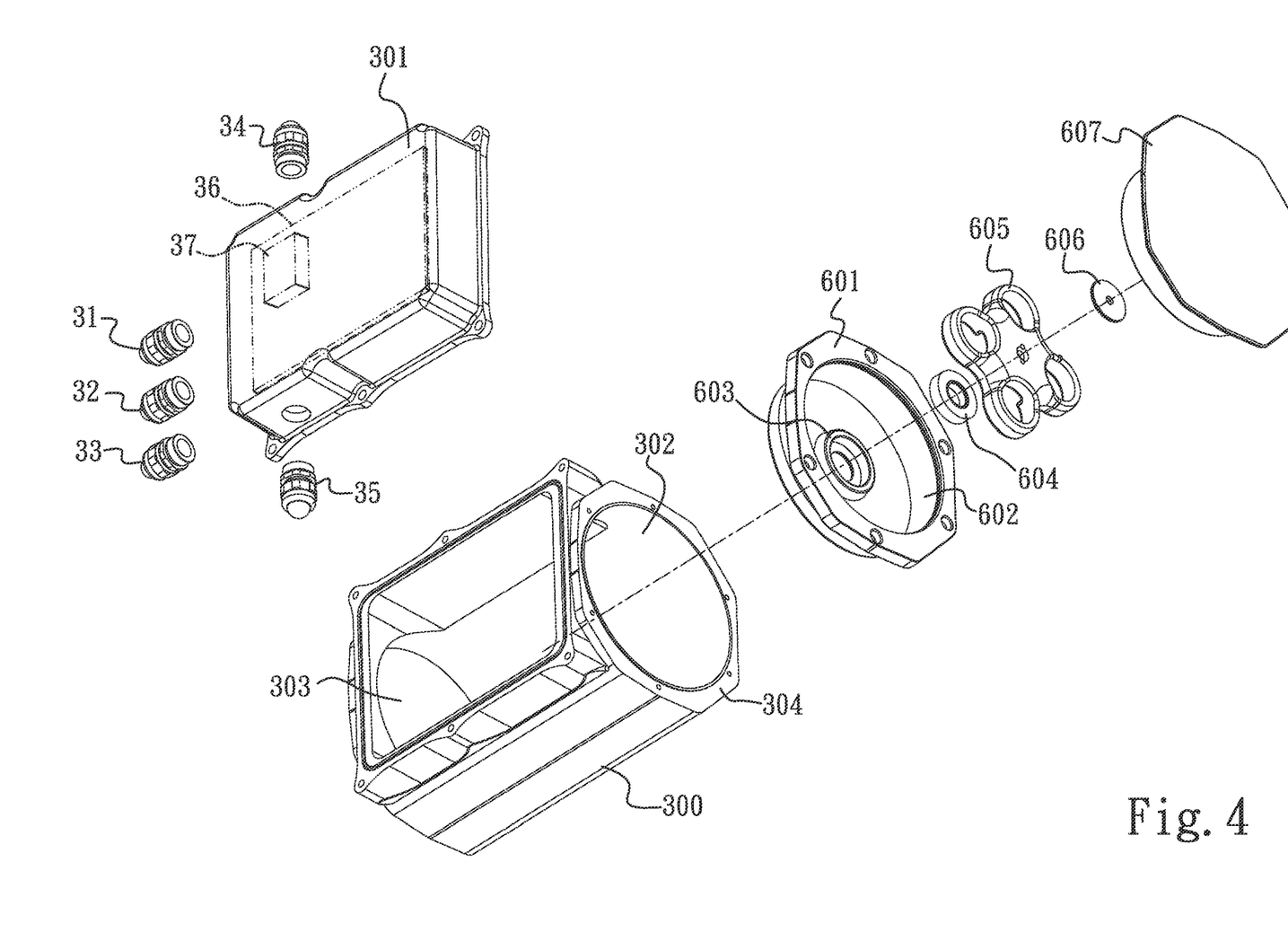
FIG. 4 is a first partial enlarged view of FIG. 3.

Please also refer to FIG. 4, said frame main body 300 is an inner hollow frame, one side of which is covered by a side cover 301, and around the side cover 301 is provided with a plurality of waterproof. Joints 31, 32, 33, 34, 35 are to be used for to taking out the connecting wires under waterproof conditions. An upper opening 302 is provided in the upper end of the frame body 300, and an opening 303 is provided in the lower end of the frame body 300. A ring plate 304 is formed on the periphery of said upper opening 302. In addition, the inner side of the side cover 301 is provided with a circuit board 36. The circuit board 36 is provided with a Bluetooth module 37 for controlling the rotation of the motor via a remote host (not shown) control of Bluetooth module 37.

Please refer to FIGS. 7 and 8 at the same time, the manual control unit 600 is locked to the ring plate 304 of the frame main body 300 by an upper cover 601, and the lower end of the upper cover 601 is provided with a lower extending barrel portion 602, the barrel portion 602 can pass through the upper opening 302 of the frame main body 300, and the inside of said barrel portion 602 is hollow, and an loopable ring 603 is disposed at the center of the bottom portion thereof, and an oil seal can be disposed inside the ring 603, 604, for installing a hand turntable 605, so that the hand turntable 605 can rotate in the barrel portion 602. The upper end of the hand wheel 605 is provided with a dial 606. The upper surface of the dial 606 is provided with a scale line to confirm the angle of rotation. A transparent top cover 607 sleeved on the upper cover 60 is also disposed. Thereby, the angle of rotation of the hand wheel 605 can be viewed without opening the top cover 607.

Figure 5:
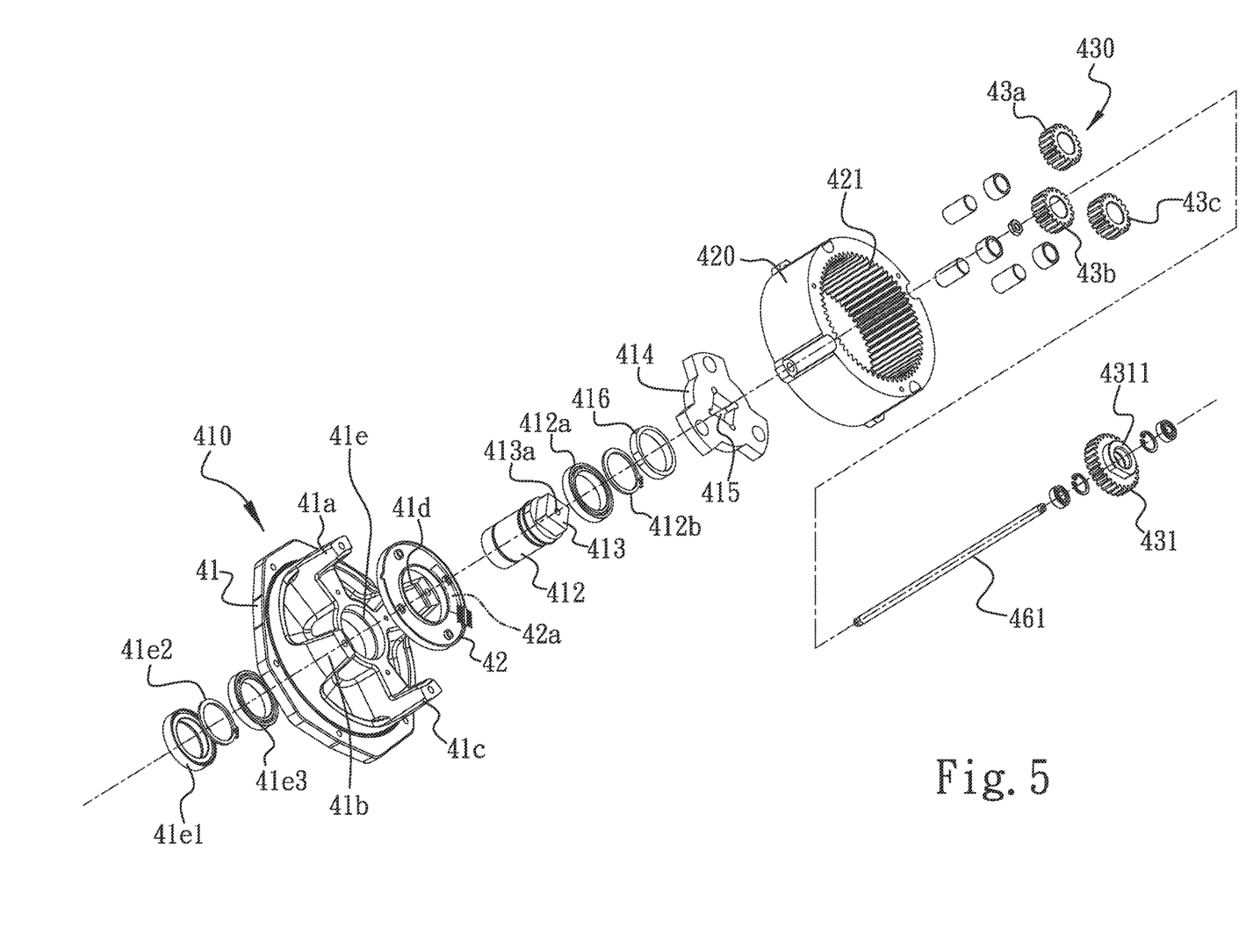
FIG. 5 is a second partial enlarged view of FIG. 3.

Please refer to FIG. 5, the driving assembly 400 has a base 410 including a bottom plate 41 and a plurality of pillars 41a, 41b, 41c, and 41d disposed at an upper end of the bottom plate, and the bottom plate 41 is lockable to the bottoms of the frame main body 300 have said pillars 41a, 41b, 41c, and 41d arranged in a ring shape and spaced apart from each other, and are extendable from the lower opening 303 of the frame main body 300.

As shown in FIG. 5, the inner edges of the said plurality of pillars 41a, 41b, 41c, 41d are locked with a PC protection cover 42, and the top ends of the said plurality of pillars 41a, 41b, 41c, 41d collectively provide the lock and fix of said inner ring gear 420. A through hole 41e is provided in the center of said bottom plate 41 for mounting the output shaft 412. The outer sleeve of the output shaft 412 is sleeved with a bearing 41e1, a C-shaped retaining ring 41e2 and an oil seal 41e3, such that it can be kept stable when rotated.

As shown in FIG. 5, the upper end of the output shaft 412 is provided with a one-piece engaging block 413, and the inner corner hole 415 of the triangular disk 414 is engaged with the center of the upper end of the insert block 413. A hole 413a is provided for locking a main shaft 461 which can penetrate the main shaft sleeve 460, and the upper end of the main shaft 461 is connected to the indicator disc 606.

As shown in FIG. 5, the upper portion of the output shaft 412 is sleeved with a bearing 412a and a C-shaped buckle 412b, and is provided with a positioning magnetic ring 416. The positioning magnetic ring 416 is sleeved on the output shaft 412. After that, the sensing circuit 42a disposed inside the PC protection cover 42 is magnetically sensed, thereby controlling the output shaft 412 to be maintained at a positioning angle, thereby controlling the valve piece 103 of the valve body 1000 to maintain at a positioning angle.

As shown in FIG. 5, said triangular disk 414 is provided with three through holes at equiangular positions to provide three gears 43a, 43b, 43c of the first gear set 430, respectively by positioning pins and bearings. After the gears 43a, 43b, 43c are mounted and positioned, they are respectively engaged with the internal teeth 421 of the inner ring gear 420. Each of the gears 43a, 43b, and 43c is simultaneously engaged with a first driving gear 431. The first driving gear 431 is sleeved on the main shaft 461, and a convex portion 4311 is formed at an upper end thereof. The plurality of through holes are provided on the disk surface of the first disk 432 to provide the three gears 441, 442, and 443 of the second gear set 440, respectively, by positioning pins and bearings, and after being mounted and simultaneously with the inner ring gear 420, the inner teeth 421 are engaged. As shown in FIG. 5, each of the gears 441, 442, and 443 of the second gear set 440 is simultaneously engaged with a second driving gear 444. The second driving gear 444 is also sleeved on the main shaft 461, and a convex portion is formed at the upper end thereof. The buckle portion 4440 is engaged with a second disc 445.

Figure 6:
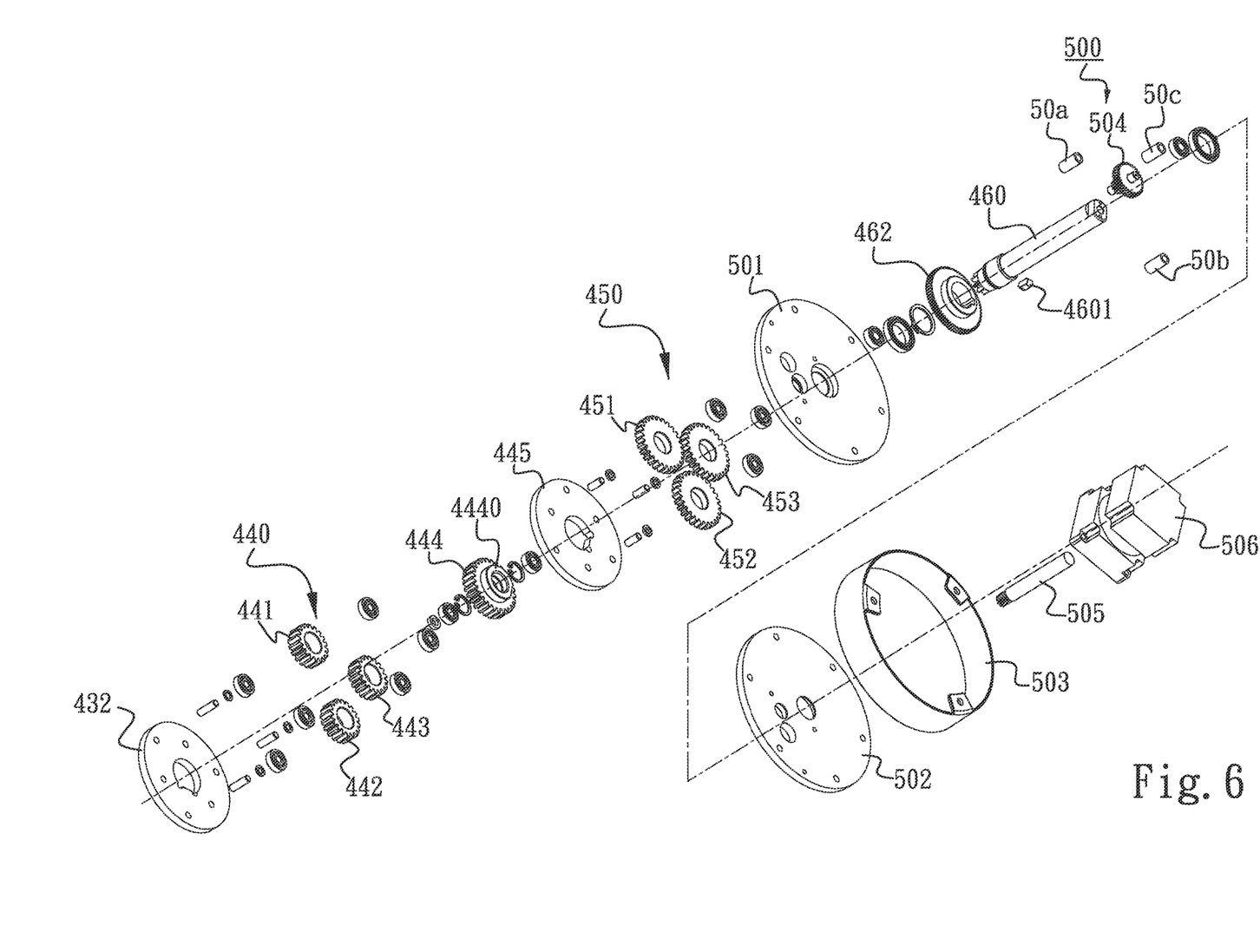
FIG. 6 is a third partial enlarged view of FIG. 3.

Please refer to FIG. 6 at the same time, the protruding portion 4311 of the first driving gear 431 is engaged with a first disc 432, and the first disc 432 is provided with a plurality of through holes on the disk surface. Such that the three gears 441, 442, and 443 that provided in the second gear set 440 can be respectively mounted by the positioning pins and the bearings, and are positioned and engaged with the internal teeth 421 of the inner ring gear 420 simultaneously. As shown in FIG. 6, each of the gears 441, 442, and 443 is simultaneously engaged with a second driving gear 444. The second driving gear 444 is also sleeved on the main shaft 461, and a convex portion 4440 and a first portion are formed at the upper end thereof so as to engage with the second disc 445.

As shown in FIGS. 5 and 6, the second disk 445 is also provided with a plurality of through holes on the disk surface to provide three gears 451, 452, 453 of the third gear set 450, respectively, by positioning tips, bearings, mounting and positioning it is then engaged with the inner teeth 421 of the inner ring gear 420 simultaneously. A drive mechanism set 500 is disposed above the second disk 445.

As shown in FIG. 6, the drive mechanism assembly 500 includes a base plate 501, an upper seat plate 502, a gear protection cover 503, a driven gear 504, a motor shaft 505, and a motor 506. The gear protection cover 503 is a ring-shaped frame body, its upper end edge is provided with a plurality of lock plates for locking the upper seat plate 502. Said upper seat plate 502 provides the motor 506 for mounting, and the output of the motor 506, which is end-connected with said motor shaft 505, is passed downwardly form the upper seat plate 502; said upper seat plate 502 is separated apart from the base plate 501 by a plurality of isolation pipes; the upper seat plate 502, the base plate 501 and the gear protection cover 503 are locked together to the upper end of the ring gear 420. The center of the upper seat plate 502 and the base plate 501 passes through said main shaft sleeve 460, and the inside of the main shaft sleeve 460 is hollow for the main shaft 461 to pass therethrough. The lower end of the main shaft sleeve 460 is engaged with a driven gear 462 by a key block 4601. The driven gear 462 is engaged with said driven gear 504. The driven gear 504 is a two-layer gear, and its upper gear is mounted thereon with the motor shaft 505; thereby, when the motor 506 drives the motor shaft 505 to rotate, since the driven gear 504, the driven gear 462 and the spindle sleeve 460 are interlocked, thereby interlocking the entire mechanism.

Thereby, the power flow of the motor drive is as follows: motor 506→motor shaft 505→driven gear 504→passive gear 462→spindle sleeve 460→gears 451, 452, 453→second disc 445→second drive gear 444→gears 441, 442, 443→first disc 432→first drive gear 431→gears 43a, 43b, 43c→triangle disc 414→output shaft 412→rotating shaft 102 and valve plate 10 of the valve body 100.

When the motor 506 cannot rotate for some reasons, it can drive through the hand turntable 605→the main shaft 461→the output shaft 412→the rotating shaft 102 of the valve body 100.

Therefore, the diverter valve drive mechanism of the present invention can control the rotation of the rotating shaft 102 of the valve body 100 and the valve plate 10 through the hand turntable 605 in addition to the rotation of the rotating shaft 102 of the motor control valve body 1000.

In conclusion from above, the diverter valve drive mechanism of the present invention is not found in the same kind of articles, and its novelty and practicality are undoubtedly combined with the requirements of the patent law, and a new patent application is then filed.

It should be understood that the exemplary embodiments described therein should be considered in a descriptive sense only and not for purposes of limitation. Descriptions of features or aspects within each embodiment should typically be considered as available for other similar features or aspects in other embodiments.

Although specific embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A diverter valve drive mechanism includes, is provided with a drive host mechanism for controlling a rotation angle of a valve plate inside a valve body, the drive host mechanism includes a frame body and a driving assembly, the driving assembly includes a base, an internal gear ring, a plurality of gear sets, a spindle sleeve, a drive mechanism set and a manual control unit; wherein the drive mechanism set is provided with a motor that can drive the spindle sleeve to rotate, interlocks the plurality of gear sets and an output shaft at the bottom center of the base, and finally drives the valve piece of the valve body to rotate; and the spindle sleeve can also be directly driven by the manual control unit, wherein the frame body is an inner hollow frame, one side of which is covered by a side cover, around the side cover is provided with a plurality of waterproof joints to be used for taking out the connecting wires under waterproof conditions, an upper opening is provided in the upper end of the frame body, and an opening is provided in the lower end of the frame body, a ring plate is formed on the periphery of said upper opening; in addition, the inner side of the side cover is provided with a circuit board; the circuit board is provided with a Bluetooth module for controlling the rotation of the motor via a remote host control of Bluetooth module, and wherein the manual control unit is locked to the ring plate by an upper cover, the lower end of the upper cover is provided with a lower extending barrel portion, the barrel portion can pass through said upper opening of said frame body, the inside of said barrel portion is hollow, and a loopable ring is disposed at the center of the bottom portion thereof, and an oil seal can be disposed inside the ring for installing a hand turntable, so that the hand turntable can rotate in the barrel portion; the upper end of the hand turntable is provided with a dial; the upper surface of the dial is provided with a scale line to confirm the angle of rotation; a transparent top cover sleeved on the upper cover is also disposed.

2. The diverter valve drive mechanism as claimed in claim 1, wherein the base of the driving assembly including a bottom plate and a plurality of pillars disposed at an upper end of the bottom plate, the inner edges of the pillars are locked with a PC protection cover, the pillars are arranged in a ring shape and spaced apart from each other, the inner ring gear is fixed to top ends of the pillars; a through hole is provided in the center of said bottom plate for mounting the output shaft, an upper portion of the output shaft is provided with a one-piece engaging block, and an inner corner hole of a triangular disk is engaged with the center of the upper end of an insert block, the hole is provided for locking a main shaft which can penetrate a sleeve of the main shaft sleeve, and an upper end of the main shaft is connected to the triangular disc.

3. The diverter valve drive mechanism as claimed in claim 2, wherein the upper portion of said output shaft is provided with a positioning magnetic ring, when the positioning magnetic ring is sleeved on the output shaft, a sensing circuit disposed inside the PC protection cover is magnetically sensed, thereby controlling the output shaft to be maintained at a positioning angle, thereby controlling the valve piece of the valve body to maintain at a positioning angle.

4. The diverter valve drive mechanism as claimed in claim 3, wherein said gear sets set inside the inner gear ring including first gear set, second gear set and third gear set; wherein the triangular disk is provided with three through holes at equiangular positions to provide three gears of the first gear set, after the gears are mounted and positioned, they are respectively engaged with the an internal teeth of the inner ring gear; each of the gears is simultaneously engaged with a first driving gear, the first driving gear is sleeved on the main shaft, and a convex portion is formed at an upper end thereof, the plurality of through holes are provided on the disk surface of the triangular disk to provide the three gears of the second gear set, after being mounted and simultaneously with the inner ring gear, the inner teeth are engaged; each of the gears of the second gear set is simultaneously engaged with a second driving gear; the second driving gear is also sleeved on the main shaft, and a convex portion is formed at the upper end thereof.

5. The diverter valve drive mechanism as claimed in claim 4, wherein the drive mechanism set is disposed above a second disk, the drive mechanism set includes a base plate, an upper seat plate, a gear protection cover, a driven gear, a motor shaft, and a motor; wherein, the gear protection cover is a ring-shaped frame body, its upper end edge is provided with a plurality of lock plates for locking the upper seat plate, said upper seat plate provides the motor for mounting, and the output of the motor, which is end-connected with said motor shaft, is passed downwardly from the upper seat plate, said upper seat plate is separated apart from the base plate by a plurality of isolation pipes; and the upper seat plate, the base plate and the gear protection cover are locked together to the upper end of the ring gear.

6. The diverter valve drive mechanism as claimed in claim 5, wherein the center of the upper seat plate and the base plate passes through said main shaft sleeve, and the inside of the main shaft sleeve is hollow for the main shaft to pass therethrough; the lower end of the main shaft sleeve is engaged with a first driven gear by a key block; the first driven gear is engaged with a second driven gear, the second driven gear is a two-layer gear and an upper gear of the second driven gear is mounted on the second driven gear with the motor shaft.

* * * * *

(12) EX PARTE REEXAMINATION CERTIFICATE (12669th)
United States Patent
Shen

(10) Number: US 11,572,962 C1
(45) Certificate Issued: Aug. 6, 2024

(54) DIVERTER VALVE DRIVE MECHANISM

(71) Applicant: HAITIMA CORPORATION, Taipei (TW)

(72) Inventor: Ming-Show Shen, Taipei (TW)

(73) Assignee: HAITIMA CORPORATION, Taipei (TW)

Reexamination Request:
No. 90/019,289, Oct. 23, 2023

Reexamination Certificate for:
Patent No.: 11,572,962
Issued: Feb. 7, 2023
Appl. No.: 17/560,754
Filed: Dec. 23, 2021

(51) Int. Cl.
*F16K 31/04* (2006.01)
*F16K 1/22* (2006.01)
*F16K 31/05* (2006.01)

(52) U.S. Cl.
CPC ............ *F16K 31/047* (2013.01); *F16K 1/221* (2013.01); *F16K 31/055* (2013.01)

(58) Field of Classification Search
None
See application file for complete search history.

(56) References Cited

To view the complete listing of prior art documents cited during the proceeding for Reexamination Control Number 90/019,289, please refer to the USPTO's Patent Electronic System.

*Primary Examiner* — Peter C English

(57) ABSTRACT

A diverter valve drive mechanism is provided with a valve body and a driving main body, wherein a valve piece is arranged inside the valve body, and by adjusting the rotation angle of the valve piece, the fluid flow through the valve body can be controlled, and the valve piece is controlled Driven by the drive main body connected to the valve body; the drive main body is provided with a driving assembly, the driving assembly is composed of a motor, a plurality of gear sets and a hand wheel, and the rotation angle of the valve piece can be controlled by a motor Adjusted or adjusted via hand wheel control, the driving assembly is provided with a Bluetooth module that allows the motor to be controlled and driven via the remote.

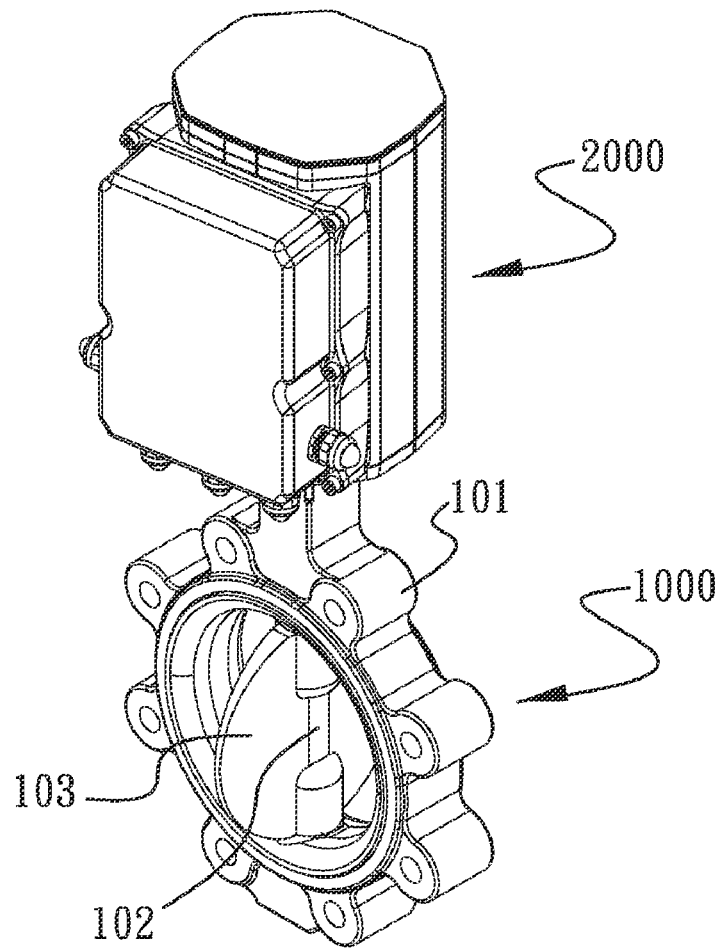

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-6 are cancelled.

\* \* \* \* \*